United States Patent
Sabourin et al.

(10) Patent No.: US 6,912,499 B1
(45) Date of Patent: Jun. 28, 2005

(54) METHOD AND APPARATUS FOR TRAINING A MULTILINGUAL SPEECH MODEL SET

(75) Inventors: Michael G. Sabourin, St-Lambert (CA); Serge Robillard, Lachine (CA)

(73) Assignee: Nortel Networks Limited, St. Laurent (CA)

( * ) Notice: Subject to any disclaimer, the term of this patent is extended or adjusted under 35 U.S.C. 154(b) by 6 days.

(21) Appl. No.: 09/386,282

(22) Filed: Aug. 31, 1999

(51) Int. Cl.$^7$ .......................... G10L 15/06; G10L 15/14
(52) U.S. Cl. ...................... 704/243; 704/255; 704/8
(58) Field of Search ......................... 704/243, 244, 704/251, 252, 255, 256, 257, 8

(56) References Cited

U.S. PATENT DOCUMENTS

| | | | |
|---|---|---|---|
| 5,195,167 A | | 3/1993 | Bahl et al. |
| 5,502,790 A | * | 3/1996 | Yi ............................. 704/256 |
| 6,085,160 A | * | 7/2000 | D'hoore et al. ............. 704/256 |
| 6,292,779 B1 | * | 9/2001 | Wilson et al. ............... 704/257 |

OTHER PUBLICATIONS

John R. Deller, Jr. et al.; Discrete–Time Processing of Speech Signals; 1993; Macmillan; pp. 116–137.*

* cited by examiner

Primary Examiner—Abul K. Azad (57) ABSTRACT

The invention relates to a method and apparatus for training a multilingual speech model set. The multilingual speech model set generated is suitable for use by a speech recognition system for recognizing spoken utterances for at least two different languages. The invention allows using a single speech recognition unit with a single speech model set to perform speech recognition on utterances from two or more languages. The method and apparatus make use of a group of a group of acoustic sub-word units comprised of a first subgroup of acoustic sub-word units associated to a first language and a second subgroup of acoustic sub-word units associated to a second language where the first subgroup and the second subgroup share at least one common acoustic sub-word unit. The method and apparatus also make use of a plurality of letter to acoustic sub-word unit rules sets, each letter to acoustic sub-word unit rules set being associated to a different language. A set of untrained speech models is trained on the basis of a training set comprising speech tokens and their associated labels in combination with the group of acoustic sub-word units and the plurality of letter to acoustic sub-word unit rules sets. The invention also provides a computer readable storage medium comprising a program element for implementing the method for training a multilingual speech model set.

24 Claims, 7 Drawing Sheets

METHOD AND APPARATUS FOR TRAINING A MULTILINGUAL SPEECH MODEL SET

FIELD OF THE INVENTION

This invention relates to speech model sets and to a method and apparatus for training speech model sets. This invention is particularly applicable to training speech model sets for use in speech recognition systems operating in multilingual environments as may be used in a telephone directory assistance system, voice activated dialing (VAD) system, personal voice dialing systems and other speech recognition enabled services.

BACKGROUND OF THE INVENTION

Speech recognition enabled services are more and more popular today. The services may include stock quotes, directory assistance, reservations and many others.

In typical speech recognition systems, the user enters his request using isolated word, connected word or continuous speech via a microphone or telephone set. If valid speech is detected, the speech recognition layer of the system is invoked in an attempt to recognize the unknown utterance. Typically, entries in a speech recognition dictionary, usually including transcriptions associated to labels, are scored in order to determine the most likely match to the utterance. The recognition of speech involves aligning an input audio signal with the most appropriate target speech model. The target speech model for a particular vocabulary item is built by concatenating the speech models of the transcription or transcriptions associated to that particular vocabulary item. For the speech recognition system to function adequately, the underlying speech models must be trained. Typically, the training of a speech model set requires the learning of allophonic contexts and estimating parameters of the speech models used to represent the acoustic characteristics related to each allophonic context.

Of particular interest here are speech recognition systems operating in multilingual environments, where the input speech signals may be representative of vocabulary items from a plurality of languages. Typically speech recognition systems of this type require a separate speech model set for each language. Each speech model set is trained on the basis of speech tokens from its respective language and each speech model is associated to a phoneme in a phoneme inventory associated to that same language. Generally, such speech recognition systems provide means for determining the language associated to the input speech signal such as prompting the user for the language of use. The speech model set associated to the language selected by the user is then used by the speech recognition system to perform the speech recognition process. Commonly, a different speech recogniser is used for each language.

A deficiency of the above-described method is that the speech recognition system requires as an input the language associated to the input utterance, which may not be readily available to the speech recognition system. Usually, obtaining the language requires prompting the user for the language of use thereby requiring an additionally step in the service being provided by the speech recognition enabled system which may lower the level of satisfaction of the user with the system as a whole. Another deficiency of the above noted method is the costs associated to developing and maintaining a speech model set for each language the speech recognition system is adapted to recognize. More specifically, each speech model set must be trained individually, a task requiring manpower for each individual language thereby increasing significantly the cost of speech recognition systems operating in multilingual environments with respect to systems operating in unilingual environments. In addition, the above-described method requires the storage of a speech model set for each language in memory thereby increasing the cost of the speech recognition system in terms of memory requirements. Finally, the above described method requires testing a speech model set for each language thereby increasing the testing cost of the speech recognition system for each language the speech recognition system is adapted to recognize.

Thus, there exists a need in the industry to refine the process of training speech models so as to obtain an improved multilingual speech model set capable of being used by a speech recognition system for recognizing spoken utterances for at least two different languages.

SUMMARY OF THE INVENTION

The present invention is directed to a multilingual speech model set and to a method and apparatus for generating same.

In accordance with a broad aspect, the invention provides a computer readable storage medium having a data structure containing a multilingual speech model set. The multilingual speech model set is suitable for use in a speech recognition system for recognizing spoken utterances for at least two different languages.

An advantage of the present invention is a lower development cost for the speech model set since a single multilingual speech model set can be used for two or more languages and a single multilingual speech model set needs to be trained and validated. Another advantage is a reduction in development time required to generate a multilingual speech model set which in turn may lead to a shorter development cycle.

Preferably but not essentially, the multilingual speech model set comprises a first subset of speech models associated to a first language and a second subset of speech models associated to a second language. The first subset and the second subset share at least one common speech model. The multilingual speech model set allows a certain speech model shared between the first subset and the second subset to be used during speech recognition of a first utterance in the first language by a speech recognition system and during speech recognition of a second utterance in the second language by the speech recognition system. In a specific example the first subset and the second subset share a plurality of speech models.

An additional advantage of the present invention is a decrease in memory requirements for the storage of the speech model set since a single multilingual model set can be stored for multiple languages, some models from the multilingual model set being shared between the multiple languages.

In accordance with another broad aspect, the invention provides a method for generating a multilingual speech model set suitable for use in a multilingual speech recognition system. The method comprises providing a group of acoustic sub-word units having a first subgroup of acoustic sub-word units associated to a first language and a second subgroup of acoustic sub-word units associated to a second language. The first subgroup and the second subgroup share at least one common acoustic sub-word unit. The method further comprises providing a training set comprising a plurality of entries, each entry having a speech token representative of a word and a label being an orthographic representation of the word. The method further comprises providing a set of untrained speech models and training the set of untrained speech models by utilizing the training set, the plurality of letter to acoustic sub-word unit rules sets and the group of acoustic sub-word units to derive the multilingual speech model set.

In accordance with another broad aspect, the invention provides an apparatus for generating a multilingual speech model set.

In accordance with another broad aspect, the invention provides a computer readable storage medium containing a program element suitable for use on a computer having a memory, the program element being suitable for generating a multilingual speech model set.

For the purpose of this specification the expression "transcription" is used to designate the acoustic representation of word as a sequence of sub-word units. A number of acoustic sub-word units can be used in a transcription such as phonemes, allophones, triphones, syllables and dyads (demi-syllables). Commonly, the phoneme is used as the sub-word unit and the representation is designated as "phonemic transcription".

Other aspects and features of the present invention will become apparent to those ordinarily skilled in the art upon review of the following description of specific embodiments of the invention in conjunction with the accompanying figures.

DETAILED DESCRIPTION

Figure 1:
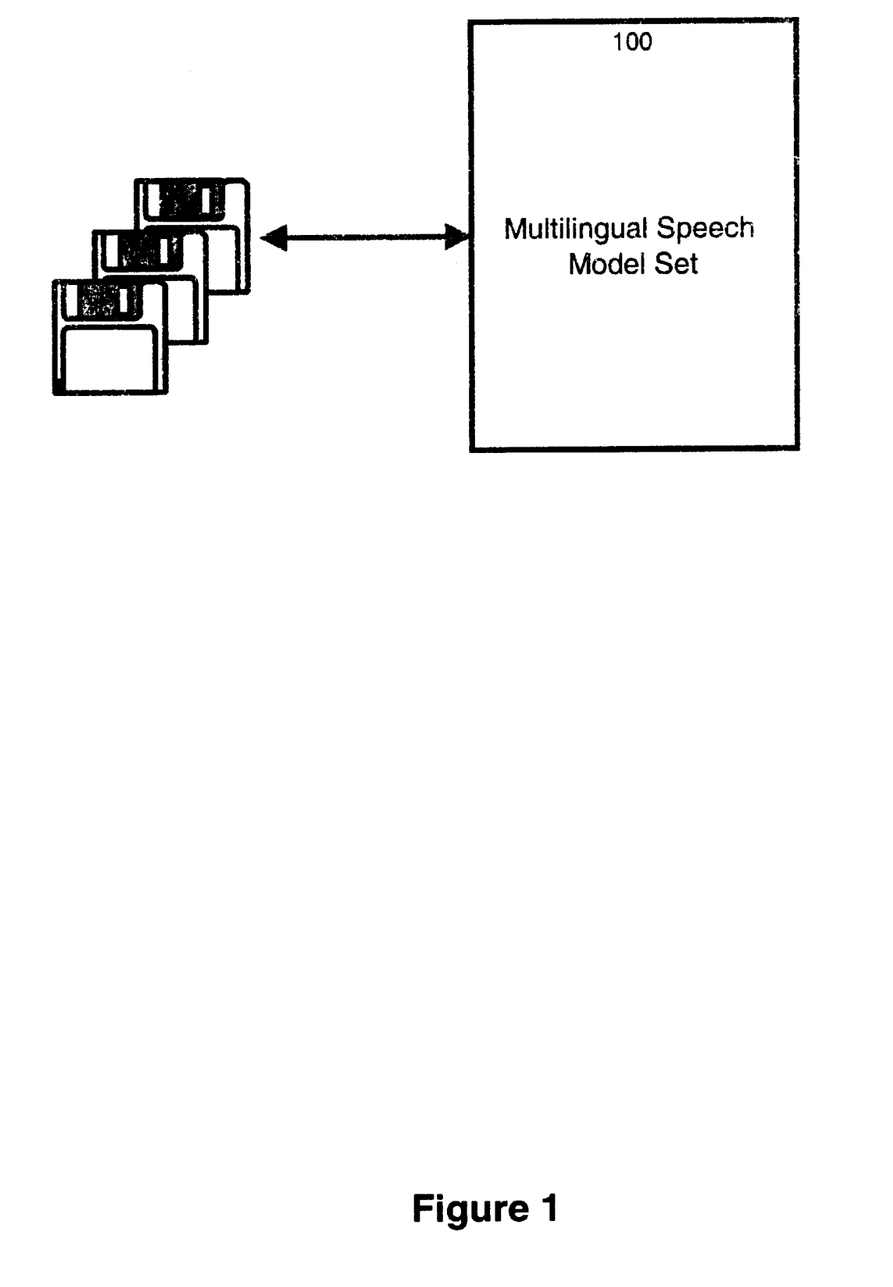
FIG. 1 shows a computer readable medium holding a multilingual speech model set in accordance with an embodiment of the invention.

In a preferred embodiment, as shown in FIG. 1, the invention provides a computer readable storage medium comprising a data structure containing a multilingual speech model set 100. The multilingual speech model set 100 is suitable for use in a speech recognition system for recognizing spoken utterances for at least two different languages. The multilingual speech model set comprises a first subset of speech models associated to a first language and a second subset of speech models associated to a second language. The first subset and the second subset share at least one common speech model. Preferably, a single copy of the shared common speech model is stored on the computer readable medium. The data structure containing a multilingual speech model set 100 provides an association between the speech models in the multilingual speech model set 100 and their respective acoustic sub-word unit. In a specific example, the acoustic sub-word units are phonemes. Optionally, the speech models in the speech model set may be representative of the allophonic context of the phonemes. In these cases, the data structure containing a multilingual speech model set 100 provides an association between the speech models in the multilingual speech model set 100 and their respective allophones.

In a preferred embodiment, the multilingual speech model set 100 allows a certain speech model shared between the first subset and the second subset to be used during speech recognition of a first utterance in a first language and during speech recognition of a second utterance in a second language different from the first language.

In a preferred embodiment, the first subset and the second subset share a plurality of speech models. In a specific example the speech models in the multilingual speech model set 100 are represented by Hidden Markov Models. Hidden Markov Models are well known in the art to which this invention pertains and will not be described in further detail here.

Figure 2:
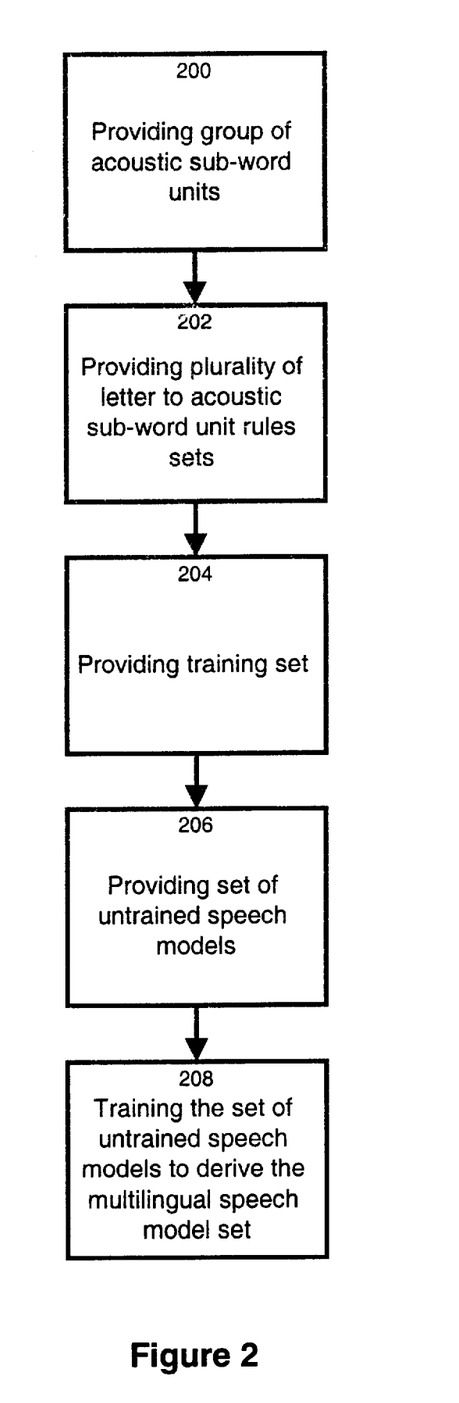
FIGS. 2 and 3 show flow diagram for generating a multilingual speech model set in accordance with the spirit of the invention.

The invention provides a method for generating the multilingual speech model set shown in FIG. 1. As shown in FIG. 2 of the drawings, the method comprises providing 200 a group of acoustic sub-word units comprised of a first subgroup of acoustic sub-word units associated to a first language and a second subgroup of acoustic sub-word units associated to a second language. The first subgroup and the second subgroup share at least one common acoustic sub-word unit.

In a preferred embodiment, the group of acoustic sub-word unit is obtained by combining sub-word units from individual languages. For each language for which the multilingual speech model set is to be representative of, an inventory of sub-word units can be obtained. The acoustic sub-word units are basic units of sound in a language. These inventories may be produced by phoneticians or may be provided as off-the-shelf components. In a specific example, the sub-word units are phonemes. The skilled person in the art will readily see that other sub-word units may be used here without detracting from the spirit of the invention. The table below shows an example of a phoneme inventory for the Spanish language.

| Phoneme Inventory for Spanish | | | | | | |
|---|---|---|---|---|---|---|
| "dZ" | "eI" | "g" | "n" | "w" | "l'" | "a" |
| "N" | "oI" | "j" | "p" | "z" | "n'" | "e" |
| "C" | "b" | "k" | "R" | "B" | "!" | "i" |
| "tS" | "d" | "l" | "s" | "D" | "T" | "o" |
| "aI" | "f" | "m" | "t" | "c" | "Z" | "u" |

Typically each language possesses a unique inventory of acoustic sub-word units. Preferably, each acoustic sub-word unit in the acoustic sub-word unit inventory for each language is associated to a feature description. The feature description provides a convenient means for establishing confusability rules for a given language and provide initialization information for the recognizer. The table below shows an example of feature descriptions of a subset of the phonemes for the Spanish language.

| Phoneme | Description |
| --- | --- |
| B | Voiced, bilabial, fricative |
| n' | Voiced, palatal, nasal |
| R | Voiced, alveolar, trill |

The acoustic sub-word unit inventories for each language are then merged into a single group of acoustic sub-word units. Preferably acoustic sub-word units that belong to the acoustic sub-word unit inventory of more than one language are stored only once in the group of acoustic sub-word units.

The method also comprises providing 202 a plurality of letter to acoustic sub-word unit rules sets, each letter to acoustic sub-word unit rules set being associated to a different language. In a preferred embodiment, the letter to acoustic sub-word unit rules are used to automatically transcribe vocabulary items and may be specified as a rule set or by a data driven approach. A rule set is typically defined by a linguist that provides a mapping between a letter and an acoustic sub-word unit target in the group of acoustic sub-word units. Providing a letter to acoustic sub-word unit rules set for a given language is well known in the art to which this invention pertains. The type of letter to acoustic sub-word unit rules will generally depend upon the language. In a specific example, for languages where the correspondence between spelling and pronunciation is regular, such as Spanish, Italian and German), letter to acoustic sub-word units are specified as a rule set while for languages where the correspondence between spelling and pronunciation is irregular, such as French or English, letter to acoustic sub-word units are assigned probabilities, and the transcriptions with the highest likelihood are used. The table below shows a subset of an example letter-to-phoneme rules set for the Spanish language.

| Letter sequence | Phoneme Target | Description |
| --- | --- | --- |
| "rr" | <R> | Double "r" maps to phoneme /R/ |
| "u"/Vowel | <w> | "u" becomes /w/ before a vowel |
| "n"/Velar | <N> | "n" becomes /N/ before a velar consonant |
| "ch" | <tS> | "ch" becomes /tS/ in all contexts |
| "r" word final | <R> | "r" becomes /R/ in word final position |
| "h" | <> | "h" maps to the null phoneme in all contexts |

As a variant, prosodic rules may be provided with each of the letter to acoustic unit rules sets. Prosodic components relate to the timing, rhythm, tone and stress usage in a given language. In a specific example, prosodic rules may be used to obtain surface form transcriptions from vocabulary items.

As another variant, exception dictionaries may be provided with each of the letter to acoustic unit rules sets, each exception dictionary being associated to a respective language. The exception dictionary comprises vocabulary items that do not follow the general letter to acoustic word sub-unit rules of a particular language. The exception dictionaries provide a mapping between vocabulary items and their associated transcriptions. This mapping may be obtained by a phonetician or in a standard off-the shelf library.

The method also comprises providing 204 a training set comprising a plurality of entries, each entry having a speech token representative of a vocabulary item and a label being an orthographic representation of the vocabulary item. The training set may be obtained by storing speech tokens and manually writing out each vocabulary item associated to the speech token or by having individuals read a predetermined sequence of vocabulary items. Such training sets are also available as off-the-shelf components. In a specific example of implementation, the training sets are reasonably accurate in that the speech tokens have a high likelihood of corresponding to the written vocabulary items. A training set is provided for each language that the multilingual speech model set is to be representative of. In another embodiment, the labels can be assigned using a speech recognizer unit by selecting the top scoring recognition candidate as the label for the utterance processed by the recognizer.

The method also comprises providing 206 a set of untrained speech models. Each speech model is associated to an acoustic sub-word unit in the group of acoustic sub-word units. In a specific example, the untrained speech models are HMMs and are assigned a complex topology of about 80 means per phonemes and three HMMs states. The untrained speech models may be obtained as off-the-shelf components or may be generated by using a nearest sub-word unit method. In the specific example where the sub-word units are phonemes, a nearest phoneme method is used. The nearest phoneme method is described in detail below. The skilled person in the art will readily observe that it may be applied to acoustic sub-word units other than phonemes without detracting from the spirit of the invention. In its broad aspect, a nearest phoneme method includes initializing a speech model of a new phoneme on the basis of a speech model of a phoneme that is acoustically similar to the new phoneme. The phoneme acoustically similar to the new phoneme may be determined by a human which determines the closest sounding phoneme or by a heuristic algorithm implemented on a computer readable medium. In the preferred embodiment, the nearest phoneme is derived on the basis of a phonological similarity method. Alternatively, the speech models may be initialized by assigning random values to the initial models and by hand aligning the speech tokens with their corresponding transcriptions for a large number of speech tokens and training the initial model values. This alternative method is particularly useful when there are no speech models available.

The invention provides a method for initializing a speech model set for a first language on the basis of a speech model set from a second language different from said first language. In a preferred embodiment, the invention makes use of the feature descriptions of the sub-word unit to generate initialization data for the speech models. In a specific example, suppose we have a first language for which speech models are available and a second language for which speech models are not available. In addition, suppose that in the second language, there is an acoustic sub-word unit, herein designated as the new acoustic sub-word unit, that is not comprised in the acoustic sub-word inventory of the first language. The acoustic sub-word units common to the first language and the second language are initialized with the speech models associated to the first language. This invention provides a method for initializing the speech model of new acoustic sub-word unit on the basis of the known speech models associated to the first language more specifically by using the nearest phoneme as a basis to initialization. For example, say the nearest phoneme to /X/ according to a certain criteria is phoneme /Y/ and that the speech model for /Y/ is known. Initialization involves copying all the model parameters (eg. State transition weights) for model /Y/ into a model for /X/. This is particularly advantageous for initializing the speech model for sub-word units in a language for speech models are not available. The method will be described below for acoustic sub-word units being phonemes. The skilled person in the art will readily observe that this method may be applied to other types or acoustic sub-word units without detracting from the spirit of the invention.

In a preferred embodiment, the present invention computes phonemic transformation weights on the basis of phonological features of the phonemes. In a typical interaction, a phoneme of the second language for which a speech model set is not available is compared against each phoneme of the first language. The phoneme of the first language having the lowest phonemic transformation weight is used to provide the initial bootstrapping speech model for the phoneme of the second language.

The phonemic transformation weight for a phoneme pair (/x/, /y/) is based on descriptive values assigned by an expert to each phoneme. In a specific example, the phonemic transformation weights are given by:

$$W(/x/, /y/) = \sum_{i=1}^{N} \alpha_i t(f/x/, f/y/) \quad \text{Equation 1}$$

where N is the number of phonological feature types and $\alpha_i$ is the relative significance of the feature type i. The functions f/x/ and f/y/ are the feature values of feature type i for phonemes /x/ and /y/, and t(f/x/, f/y/) is the transformation penalty between feature values f/x/ and f/y/. The meaning of feature values, feature types, and transformation cost will be further explained.

As mentioned previously, a phoneme inventory may be used to describe words in a given language. Typically, each phoneme sound is described by a plurality of feature types, each of which may take on a number of values. A specific example of feature types, along with their permissible values, is shown below in Table I.

| Feature Type Table I, Feature Types and Values | |
|---|---|
| Feature | Values |
| Voicing | voiced, unvoiced |
| Place | bilabial, labio-dental, dental, alveolar, palatal, palato-alveolar, velar, labio-velar, labio-palatal, uvular. Pharyngeal. Glottal |
| Manner | stop, fricative, nasal, approximant, vowel, lateral, trill, flap, click, ejective, implosive, affricate |
| Realization | aspirated, unexploded, syllabic, murmured, long, velarized, labialized, palatalized, rhoticized, nasalized, pharyngealized, tense |
| Frontness | front, center, back |
| Height | high, semi-high, upper-middle, middle, low |
| Roundness | rounded, unrounded |

The phoneme /a/, for example, as in the word "cat," is assigned the feature values: "low," "front," and "unrounded". These feature values correspond to the feature types "height," "frontness," and "roundness," respectively. The feature types "voicing," "place," "realization," and "manner." are not specifically defined for /a/, and accordingly, /a/ is said to have a null feature value for these feature types. Each phoneme in each language of interest is assigned corresponding feature values.

Each feature type relates loosely to the physiological action used to make the phoneme sound. "Place" refers to the position of the primary articulator (e.g. tongue blade, tongue dorsum, lips), "manner" refers to the articulatory method used to generate the sound, "realization" refers to allophonic attributes of the production of the sound, "frontness" and "height" refer to tongue tip position in the production of the vowels, and "roundness" refers to the lip shape during production of the vowels. The feature types are not all equally significant in the production of a sound. For example, the significance of "manner" is stronger than that of "rounding." The relative significance value, $\alpha_i$, is used to quantify the significance of the various feature types. Preferably, the values of $\alpha_i$ are assigned by a phonetician or speech expert. These significance values are well known in the art of linguistics. In a specific example, the International Phonemic Alphabet includes descriptions of this type and may be used in the context of this invention.

In addition to the relative significance value, $\alpha_i$, transformation penalties are used to calculate the phonemic transformation weights. The transformation penalty is a function of two feature values of a feature type, and loosely measures the acoustic consequences of changing from an articulation of one feature type to another. In a manner similar to the significance values, the transformation penalties were determined by phonetician or speech expert.

The "realization" feature type is preferably a sequence of binary features. The particular binary values for the sequence are zero when a "realization" feature value is transformed into the identical feature and one when the "realization" feature value is transformed into a second feature value. In more precise terms, let x be one of the realization attributes X, where X is the set (aspirated, unexploded, syllabic, murmured, long, velarized, labialized, palatalized, rhoticized, pharyngealized, tense). If x changes from x to not-x (e.g. from aspirated to unexploded), the transformation penalty is one, while if x does not change (e.g., the feature value of both phonemes is aspirated), the transformation penalty is zero.

Using equation 1 and the transformation penalties, the phonemic transformation weights can be calculated for any phoneme symbol pair (/x/, /y/). As an example transformation weight calculation, consider the phoneme symbol pair (/b/) {voiced bilabial stop}, and /d/ {palato-alveolar}. Applying equation 1, and using the appropriate values, the feature weight for place is 0.7, and the transformation penalty from "bilabial" to "palato-alveolar" is 0.3, which leads to a phoneme transformation penalty of t(/b/,/d/)=0.21.

The method also comprises training 208 the set of untrained speech models by utilizing the training set, the plurality of letter to acoustic sub-word unit rules sets and the group of acoustic sub-word units to derive the multilingual speech model set 100.

Figure 3:
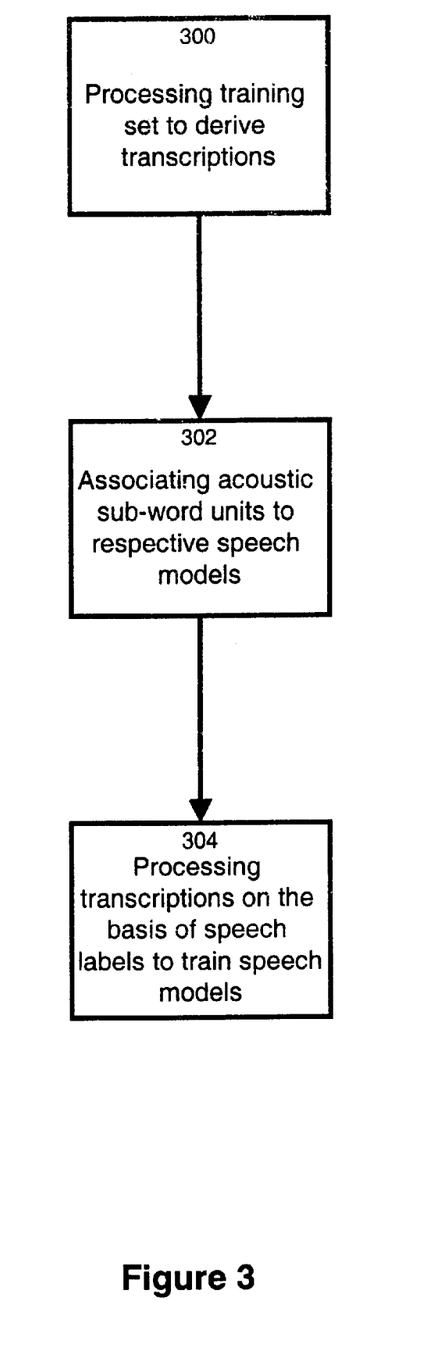

In a preferred embodiment, as shown in FIG. 3 of the drawings, training 208 the set of untrained speech models comprises processing 300 at least some of the entries in the training set on the basis of a certain letter to acoustic sub-word unit rules set in the plurality of letter to acoustic sub-word unit rules sets to derive a group of transcriptions. In a specific example, there is a plurality of training sets, each set being associated to a language. A given training set associated to a given language is first processed to extract the labels from each entry. This operation will be readily available to those skilled in the art. The labels extracted from the given training set are then processed by a given letter to acoustic sub-word unit rules set, the given letter to acoustic sub-word unit rules set being associated to the given language. The result of this processing is a group of transcriptions associated to a given language, the transcriptions in the group of transcriptions comprising a sequence of acoustic sub-word units of the group of acoustic sub-word units. This processing is performed on all the training sets of the plurality of training sets. Optionally, the groups of transcriptions from each respective training set are combined to form a compound training set.

As a variant, the training set comprises a plurality of entries, the entries being representative of vocabulary items in one or more languages. The training set is first processed to extract the labels from each entry. The labels extracted from the training set are then processed by a subset of the plurality of letter to acoustic sub-word unit rules sets to derive a plurality of transcriptions. A first transcription in the plurality of transcriptions corresponding to a certain vocabulary item is associated to a first language and a second transcription in the plurality of transcriptions corresponding to the same certain vocabulary item is associated to a second language different from the first language.

As yet another variant, prosodic rules may be used to process the transcriptions generated by with the letter to acoustic unit rules sets to derive surface form transcriptions. The prosodic rules are associated to respective languages may be applied to the groups of transcriptions associated to the same languages. Alternatively, a subset of the prosodic rules may be applies to the transcriptions associated to languages different from the languages associated to the prosodic rules being considered.

In accordance with a preferred embodiment, training the set of untrained speech models further comprises associating 302 the acoustic sub-word units in the group of acoustic sub-word units to respective speech models in the set of untrained speech models.

The training of the set of untrained speech models further comprises processing 304 the group of transcriptions generated at step 300 on the basis of a speech token of the corresponding entry in the training set whereby training the set of untrained speech models to derive the multilingual speech model set. In a specific example of implementation, the speech tokens in said training set are processed by a feature extraction unit to convert the speech signals into a set of numeric values for storage in a vector representative of acoustic information. A specific example of a vector is a cepstral vector. Each speech token is associated to a set of cepstral vectors, one vector being associated to a frame of the speech token. The cepstral vectors are then aligned with the phonemes of the transcription corresponding to the speech token. In a specific example, for the initial alignment, the cepstral vectors of the speech token are randomly divided between the phonemes of the transcription. In another specific example, vector quantization or Kohonen associative mapping is used to provide the initial alignment of the cepstral vectors and the phonemes. These cepstral vectors are then used to condition the untrained speech models thereby training the speech models. In a preferred embodiment, the speech models are trained using a maximum likelihood method. The speech models are HMMs having a set of states and transitions between these states, each state represented by a state probability and a set of transition probabilities. The state probability is modeled as a mixture of Gaussian distributions where each Gaussian distribution has a means and a covariance matrix. The means and covariance matrices may be shared be other models without detracting from the spirit of the invention. The transition probabilities are exponential distributions with mean $\mu$. In a specific example, the untrained speech models are trained using maximum a posteriori adaptation (MAP) as described in Gauvain J. -L. and Lee C. -H. (1994) "maximum a posteriori estimation for multivariate Gaussian mixture observations of Markov chains" IEEE Trans. Speech Audio Process. 2, pp. 291–298. The content of this document is hereby incorporated by reference. Other methods of training speech models on the basis of speech tokens may be used here without detracting from the spirit of the invention. In a preferred embodiment several training iterations are performed to condition the speech models. The iterations are performed by obtaining another assignation of the vectors to the phonemic transcription of the speech label and restarting the training.

In another specific example, the acoustic sub-word units are selected from the set consisting of allophones, triphones biphones or any other representation of a phoneme on the basis of context.

Optionally, at least part of the speech models in the multilingual speech model set are associated to allophones. In a specific example, for speech recognition systems a two pass search, the multilingual speech model set comprises two subsets namely a first subset for the first pass comprises a small number of speech models associated to allophones (typically 250) and a second subset for the second pass comprising a larger number of speech models associated to allophones (typically 10 000). Having generated multilingual speech models associated to phonemes, the speech labels in the training set are segmented on the basis of the phonemes and more precise speech models are build. The allophonic context is defined on the basis of adjoining phonemes and an allophonic decision tree.

A question set is provided to build the decision tree allophones. Decision trees have been described in U.S. Pat. No. 5,195,167 by Bahl et al. "Apparatus and Method of Grouping Utterance of a Phoneme into Context-Dependent Categories based on Sound-Similarity for Automatic Speech Recognition", Mar. 16, 1993. The content of this document is hereby incorporated by reference. The invention provides a universal question set by grouping acoustic sub-word units into classes and develop a question set on the basis of the class and feature scores. Typically, each question involves a class of phonemes ranging from single phonemes to substantially large sets. Larger classes are built by concatenating smaller classes. The table below shows a specific example of entries in the universal question set. In a specific example of implementation, the universal question set is language independent.

| "Question" | Components | Constituents |
| --- | --- | --- |
| VOICED_FRICATIVE | B v D z Z Z+ Z. z. z' C X G H | B v D z Z Z+ Z. z. z' C X G H |
| VOICELESS_FRICATIVE | P f T s S S+ S. s. s' c x K h | P f T s S S+ S. s. s' c x K h |

-continued

| "Question" | Components | Constituents |
|---|---|---|
| LATERAL_FRICATIVE | F V | F V |
| FRICATIVE | VOICED_FRICATIVE | B v D z Z Z+ Z. z. |
| | VOICELESS_FRICATIVE | z' C X G H P f T s |
| | LATERAL_FRICATIVE | S S+ S. s. s' c x K |
| | | h F V |
| VOICED_AFFRICATE | dz dZ | dz dZ |
| VOICELESS_AFFRICATE | pf ts tsh tS tS+ | pf ts tsh tS tS+ |
| | tS+h ts. ts.h | tS+h ts. ts.h |
| AFFRICATE | VOICED_AFFRICATE | dz dZ pf ts tsh tS |
| | VOICELESS_AFFRICATE | tS+ tS+h ts. ts.h |
| VOICELESS_PLOSIVE | p ph t; t;h t th t. | p ph t; t;h t th t. |
| | t.h t' t'h k kh q | t.h t' t'h k kh q |
| | qh ? | qh ? |
| VOICELESS_CONSONANT | VOICELESS_FRICATIVE | P f T s S S+ S. s. |
| | VOICELESS_AFFRICATE | s' c x K h pf ts |
| | VOICELESS_PLOSIVE | tsh tS tS+ tS+h ts. |
| | | ts.h p ph t; t;h t |
| | | th t. t.h t' t'h k |
| | | kh q qh ? |

Once the allophinic context is defined, the allophones are extracted by pruning the allophonic decision tree where appropriate. For each speech token, the corresponding phonemic transcription is examined. For each phoneme in the transcription, the adjacent "N" phoneme neighbors are examined for membership n a class of phonemes. The classes in which the neighboring phonemes belong are tabulated. The phonemic transcriptions associated to the speech labels of the training set are relabeled with the allophones on the basis of the defined allophonic context. Speech models are initialized as in phoneme modeling and the speech models associated to the allophones are trained on the basis of a maximum a posteriori adaptation (MAP) as described in Gauvain J. -L. and Lee C. -H. (1994) "maximum a posteriori estimation for multivariate Gaussian mixture observations of Markov chains" IEEE Trans. Speech Audio Process. 2, pp. 291–298. Preferably, the number of speech models in the multilingual speech model set is a configurable parameter.

Preferably, the method also comprises an evaluation set for verifying the performance of the multilingual speech model set. The test set is comprised of speech tokens non-correlated to the speech tokens in the training set, the speech tokens in the evaluation set being representative of vocabulary items from two or more languages. Each speech token in the evaluation set is associated to a corresponding orthographic representation of a vocabulary item. The performance of the multilingual speech model set is evaluated by processing the speech tokens in the evaluation set on the basis of a speech recognition method utilizing the multilingual speech model set. The application speech recognition method provides a set of recognition results which are compared to the orthographic representation of a vocabulary items corresponding to the input speech tokens to determine the statistical performance of the speech recognition unit as a whole. Speech recognition methods are well-known in the art to which this invention pertains and will not be described in greater detail herein.

Figure 4:
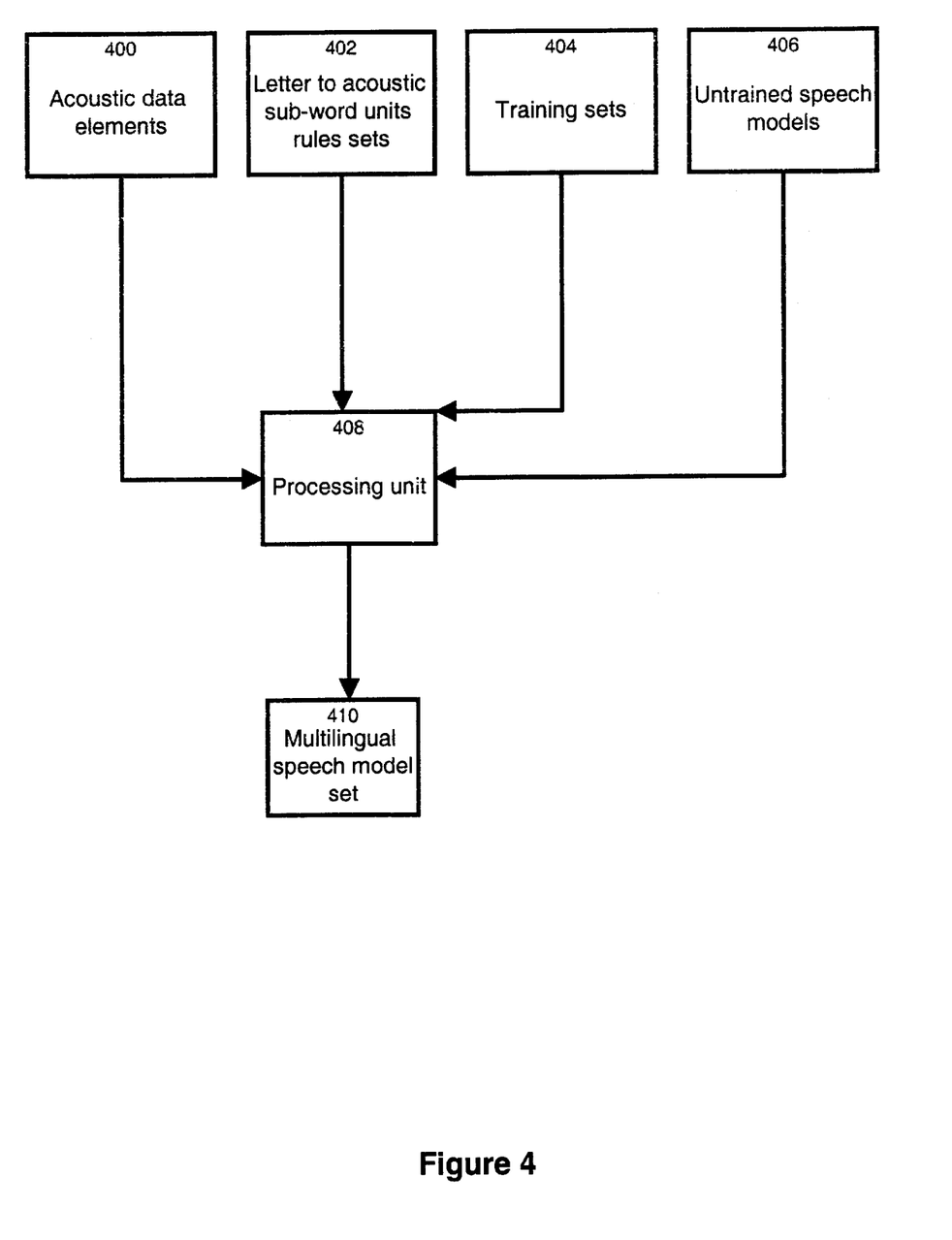
FIG. 4 shows a high-level block diagram of an apparatus for generating a multilingual speech model set in accordance with the spirit of the invention.

In another embodiment, as shown in FIG. 4, the invention provides an apparatus for generating a multilingual speech model set suitable for use in a multilingual speech recognition system. The apparatus comprises a first memory unit 400 for storing acoustic data elements representative of a group of acoustic sub-word units comprising a first subgroup of acoustic sub-word units associated to a first language and a second subgroup of acoustic sub-word units associated to a second language. The first subgroup and the second subgroup share at least one common acoustic sub-word unit. The apparatus also comprises a second memory unit 402 for storing a plurality of letter to acoustic sub-word unit rules sets, each letter to acoustic sub-word unit rules set being associated to a different language. The apparatus also provides a third memory unit 404 suitable for storing a training set comprising a plurality of entries, each entry having a speech token representative of a word and a label being an orthographic representation of the word. The apparatus also provides a fourth memory unit 406 for storing a set of untrained speech models. The apparatus also provides a processing unit 408 coupled to the first memory unit 400, the second memory unit 402, the third memory unit 404, fourth memory unit 406, the processing unit 408 being operative for training the set of untrained speech models 406 by utilizing the training set 404, the plurality of letter to acoustic sub-word unit rules sets 402 and the group of acoustic sub-word units 400 to derive a multilingual speech model set 410.

In a specific example, the acoustic sub-word units comprise phonemes. In another specific example, the acoustic sub-word units comprise allophones.

Figure 5:
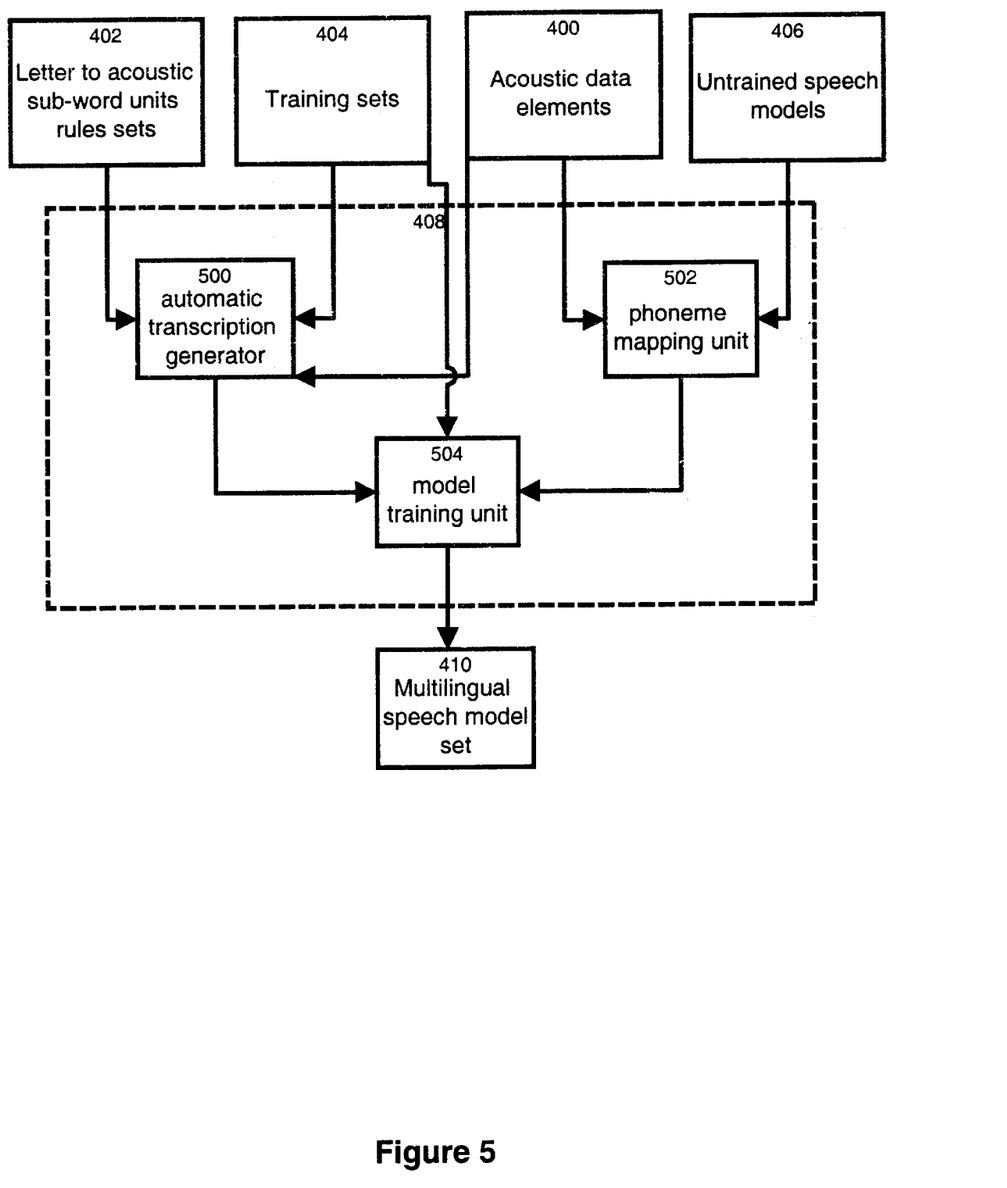
FIG. 5 shows a detailed block diagram of the apparatus of FIG. 4 for generating a multilingual speech model set in accordance with the spirit of the invention.

The processing unit 408, as shown in greater detail in FIG. 5 of the drawings, comprises an automatic transcription generator 500 for processing at least some of the entries in the training set 404 on the basis of a certain letter to acoustic sub-word unit rules set in the plurality of letter to acoustic sub-word unit rules sets 402 to derive a group of transcriptions. In a specific example, the apparatus comprise a plurality of training sets 404, each set being associated to a different language. A given training set associated to a given language is first processed by the automatic transcription generator to extract the labels from each entry. This operation will be readily available to those skilled in the art. The labels extracted from the given training set are then processed by the automatic transcription generator on the basis of a given letter to acoustic sub-word unit rules set, the given letter to acoustic sub-word unit rules set associated to the same given language as the training set being processed. The output of the automatic transcription generator 500 is a group of transcriptions associated to a given language, the transcriptions in the group of transcriptions comprising a sequence of acoustic sub-word units of the group of acoustic sub-word units 400. This automatic transcription generator processes all the training sets of the plurality of training sets 404. Optionally, the groups of transcriptions generated on the basis of each respective training set may be combined to form a compound training set.

As a variant, the training set 404 comprises a plurality of entries, the entries being representative of vocabulary items in two or more languages. The number of entries in the training set depends on the processing time available and the urgency of obtaining the results. The training set is first processed by the automatic transcription generator to extract the labels from each entry. The automatic transcription generator 500 is operative for processing the labels extracted from the training set 404 on the basis of a subset of the plurality of letter to acoustic sub-word unit rules sets 402 to derive a plurality of transcriptions. Each transcription in the plurality of transcriptions comprises a sequence of acoustic sub-word units of the group of acoustic sub-word units 400. A first transcription in the plurality of transcriptions corresponding to a certain vocabulary item is associated to a first language and a second transcription in the plurality of transcriptions corresponding to the same certain vocabulary item is associated to a second language different from the first language.

The processing unit 408 further comprises a phoneme mapping unit 502 operatively connected to the first memory unit 400 and fourth memory unit 406 for associating the acoustic sub-word units in the group of acoustic sub-word units to respective speech models in said set of untrained speech models.

The outputs of the automatic transcription generator 500 and of the phoneme mapping unit are operatively connected to a model training unit 504. The model training unit is also operatively coupled to the training set 404. The model training unit 504 is operative for processing the group of transcriptions received from the transcription generator 500 on the basis of a speech token of the corresponding entry in the training set 404 whereby training the set of untrained speech models 406 to derive the multilingual speech model set 410 on the basis of the method described in connection with FIG. 3.

In a specific embodiment, the apparatus depicted in FIGS. 4 and 5 comprises a processor coupled to a computer readable storage medium, the computer readable storage medium comprising a program element for execution by the processor for implementing the processing unit 408.

As a variant, the processing unit 408 is a hardware device such as a ROM or other chip programmed on the basis of the above described method.

Figure 6:
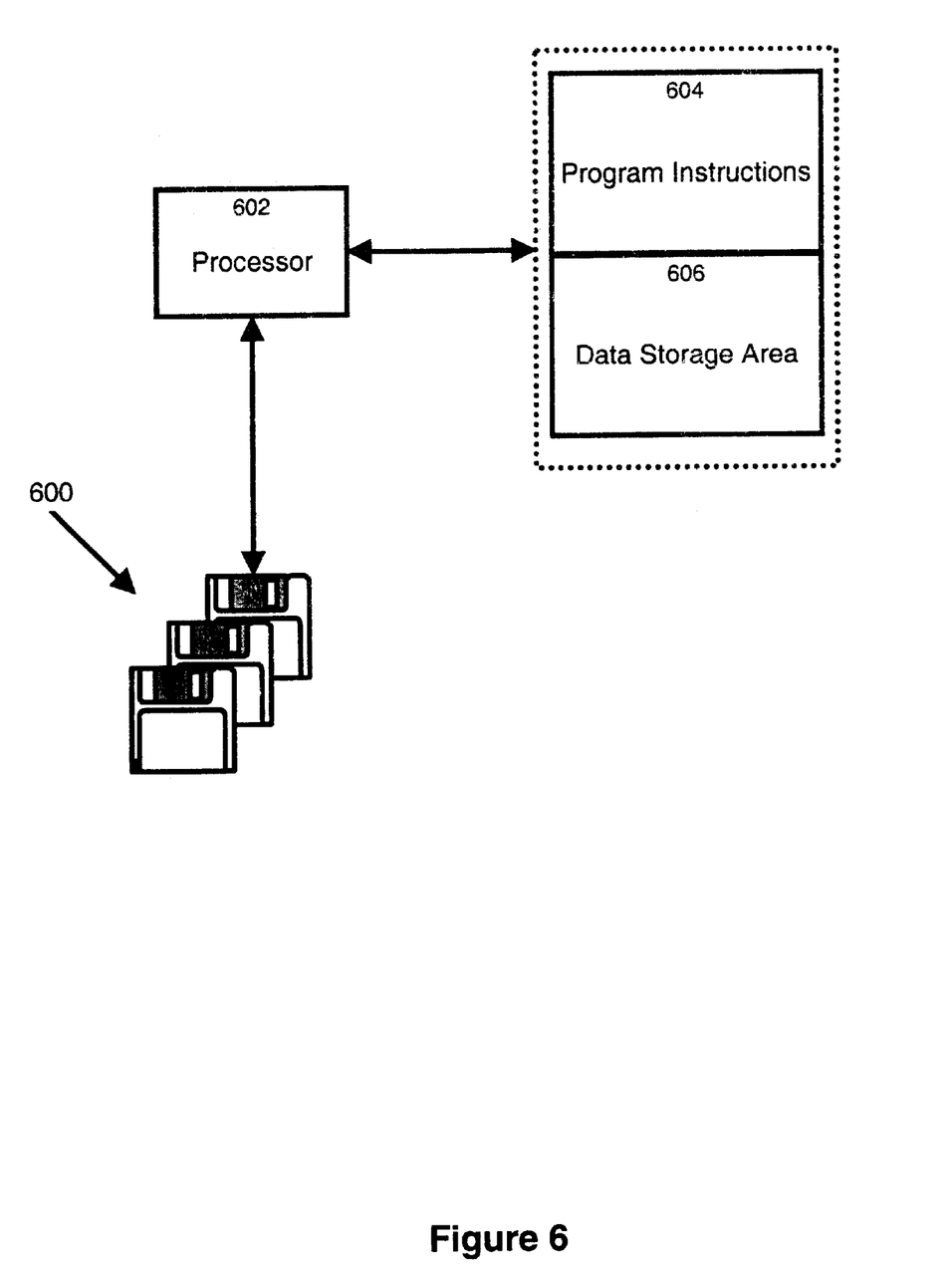
FIG. 6 shows an alternative embodiment of an apparatus for generating a multilingual speech model set in accordance with the spirit of the invention.

The above-described method for generating a multilingual speech model set can also be implemented on any suitable computing platform as shown in FIG. 6. Such computing platform typically includes a CPU 602 and a memory or computer readable medium 600 connected to the CPU 602 by a data communication bus. The memory stores the data 606 and the instructions of the program element 604 implementing the functional blocks depicted in the drawings and described in the specification. In a specific example, the program element 604 implements the processing unit 408 and the data 606 comprises the group of acoustic sub-word units, the plurality of letter to acoustic sub-word units rules sets, the training sets and the untrained speech models. The program element 604 operates on the data 606 in accordance with the algorithms described above to generate a multilingual speech model set using the techniques described in this specification.

Figure 7:
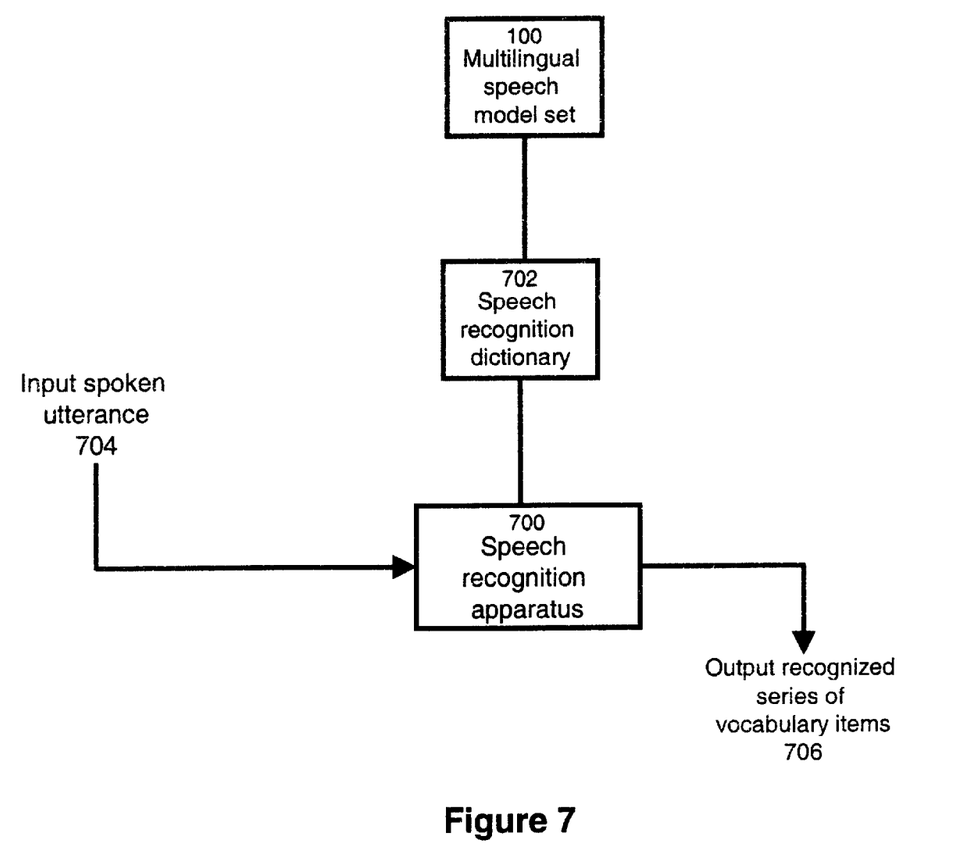
FIG. 7 shows a speech recognition apparatus comprising the computer readable medium shown in FIG. 1.

The multilingual speech model set 100 may be used in a speech recognition enabled system such as a speech recognition unit and a directory assistance system to provide multilingual speech recognition capabilities. Such a speech recognition enabled system, of the type depicted in FIG. 7, typically comprises and input 704 for receiving a signal derived from a spoken utterance, a processing unit 700 implementing speech recognition functionality and an output 706 for releasing the recognition results. The processing unit 700 is coupled to a speech recognition dictionary 702 having a plurality of vocabulary items. Each vocabulary items in said speech recognition dictionary 702 is associated to a least one transcription, each transcription comprising a sequence of acoustic sub-word units. In a specific example, the speech recognition dictionary 702 comprises vocabulary items from multiple languages. The speech recognition dictionary 702 is coupled to the multilingual speech model set 100 thereby providing association between acoustic sub-word units in the transcriptions and the multilingual speech models in the multilingual speech model set 100. During the speech recognition process, the processing unit 700 makes use the multilingual speech models in the multilingual speech model set 100 to score the input utterance to obtain a match to the recognition result in the speech recognition dictionary. The functioning of a processing unit 700 providing speech recognition functionality is well-known in the art to which this invention pertains an consequently will not be described in further detail. The above-described speech recognition enabled system does not require the language of input to effect the speech recognition process.

Although the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

What is claimed is:

1. A method for generating a multilingual speech model set, said multilingual speech model set being suitable for use in a multilingual speech recognition system, said method comprising:

a) providing a group of acoustic sub-word units comprising:
   a first subgroup of acoustic sub-word units associated to a first language with each acoustic sub-word unit associated in said first subgroup having an associated speech model;
   a second subgroup of acoustic sub-word units associated to a second language;
   said first subgroup and said second subgroup sharing at least one common acoustic sub-word unit;

b) providing a training set comprising a plurality of entries, each entry having a speech token representative of a word and a label being an orthographic representation of the word;

c) providing a set of untrained speech models, said set of untrained speech models having at least a first untrained speech model, further comprising,
   (i) providing said first untrained speech model by initializing at least one acoustic sub-word unit of said second subgroup with said associated speech model of at least one acoustic sub-word unit of said first subgroup that is acoustically similar to said at least one acoustic sub-word unit of said second subgroup;

d) training the set of untrained speech models by utilizing said training set, a plurality of letter to acoustic sub-word unit rules sets and said group of acoustic sub-word units to derive the multilingual speech model set, each letter to acoustic sub-word unit rules set being associated to a different language.

2. A method as defined in claim 1, wherein the acoustic sub-word units comprise phonemes.

3. A method as defined in claim 2, wherein training the set of untrained speech models comprises processing at least some of the entries in said training set on the basis of a certain letter to acoustic sub-word unit rules set to derive a group of transcriptions, the certain letter to acoustic sub-word unit rules set being associated to a certain language, the transcriptions in said group of transcriptions comprising a sequence of acoustic sub-word units of said group of acoustic sub-word units, the transcriptions in said group of transcriptions being associated to a certain language.

4. A method as defined in claim 3, wherein training the set of untrained speech models further comprises:
associating the acoustic sub-word units in said group of acoustic sub-word units to respective speech models in said set of untrained speech models;
processing the group of transcriptions on the basis of a speech token of the corresponding entry in said training set whereby training said set of untrained speech models to derive the multilingual speech model set.

5. A method as defined in claim 2, wherein training the set of untrained speech models comprises processing the entries in said training set on the basis of a plurality of letter to acoustic sub-word unit rules set to derive a plurality of transcriptions, each transcription in said plurality of transcriptions comprising a sequence of acoustic sub-word units of said group of acoustic sub-word units, a first transcription in said plurality of transcriptions being associated to the first language, a second transcription in said plurality of transcriptions being associated to the second language.

6. A method as defined in claim 5, wherein said transcriptions in the plurality of transcriptions are transcriptions of a first type, said method further comprising:
providing a universal question set that is language independent;
processing said plurality of transcriptions of the first type on the basis of said universal question set to derive a plurality of transcriptions of a second type, the plurality of transcriptions of a second type being characterized as comprising context dependent acoustic sub-word units.

7. A method as defined in claim 1, further comprising initializing at least some acoustic sub-word units in said second subgroup of acoustic sub-word units with respective speech models in said first subgroup to generate untrained speech models at least in part on the basis of a nearest sub-word unit method.

8. A method as defined in claim 1, further comprising:
computing transformation weights for use in determining said at least one acoustic sub-word unit of said first subgroup that is acoustically similar to said at least one acoustic sub-word unit of said second subgroup.

9. A method as defined in claim 1, further comprising:
comparing said at least one acoustic sub-word unit of said second subgroup with each acoustic sub-word unit of said first subgroup and computing transformation weights to for determining said at least one acoustic sub-word unit of said first subgroup that is acoustically similar to said at least one acoustic sub-word unit of said second subgroup.

10. A computer readable storage medium comprising a data structure containing a multilingual speech model set generated by the method defined in claim 1.

11. An apparatus for generating a multilingual speech model set, said multilingual speech model set being suitable for use in a multilingual speech recognition system, said apparatus comprising:
a) a first memory unit for storing acoustic data elements representative of a group of acoustic sub-word units comprising:
a first subgroup of acoustic sub-word units associated to a first language with each acoustic sub-word unit having an associated acoustic data element;
a second subgroup of acoustic sub-word units associated to a second language;
said first subgroup and said second subgroup sharing at least one common acoustic sub-word unit;
b) a second memory unit for storing a plurality of letter to acoustic sub-word unit rules sets, each letter to acoustic sub-word unit rules set being associated to a different language;
c) a third memory unit suitable for storing a training set comprising a plurality of entries, each entry having a speech token representative of a word and a label being an orthographic representation of the word;
d) a fourth memory unit for storing a set of untrained speech models, said set of untrained speech models comprising at least one untrained speech model, said one untrained speech model generated by initializing at least one acoustic sub-word unit of said second subgroup with said associated acoustic data element of at least one acoustic sub-word unit of said first subgroup that is acoustically similar to said at least one acoustic sub-word unit of said second subgroup;
e) processing unit coupled to:
said first memory unit;
said second memory unit;
said third memory unit;
said fourth memory unit;
said processing unit being operative for training the set of untrained speech models by utilizing said training set, said plurality of letter to acoustic sub-word unit rules sets and said group of acoustic sub-word units to derive the multilingual speech model set.

12. An apparatus as defined in claim 11, wherein the acoustic sub-word units comprise phonemes.

13. An apparatus as defined in claim 12, wherein said processing unit comprises an automatic transcription generator for processing at least some of the entries in said training set on the basis of a certain letter to acoustic sub-word unit rules set in said plurality of letter to acoustic sub-word unit rules sets to derive a group of transcriptions, the certain letter to acoustic sub-word unit rules set being associated to a certain language, the transcriptions in said group of transcriptions comprising a sequence of acoustic sub-word units of said group of acoustic sub-word units, the transcriptions in said group of transcriptions being associated to a certain language.

14. An apparatus as defined in claim 12, wherein said automatic transcription generator is operative for processing the entries in said training set on the basis of said plurality of letter to acoustic sub-word unit rules sets to derive a plurality of transcriptions each transcription in said plurality of transcriptions comprising a sequence of acoustic sub-word units of said group of acoustic sub-word units, a first transcription in said plurality of transcriptions being associated to the first language, a second transcription in said plurality of transcriptions being associated to the second language.

15. An apparatus as defined in claim 14, wherein said transcriptions in the plurality of transcriptions are transcriptions of a first type, said apparatus further comprising:
- a fifth memory unit for storing a universal question set, said universal question set being language independent;
- said processing unit being further operative for processing said plurality of transcriptions of the first type on the basis of said universal question set to derive a plurality of transcriptions of a second type, the plurality of transcriptions of a second type being characterized as comprising context dependent acoustic sub-word units.

16. An apparatus as defined in claim 13, wherein said processing unit further comprises:
- a phoneme mapping unit for associating the acoustic sub-word units in said group of acoustic sub-word units to respective speech models in said set of untrained speech models;
- a model training unit for processing the group of transcriptions on the basis of a label of the corresponding entry in said training set whereby training said set of untrained speech models to derive the multilingual speech model set.

17. An apparatus as defined in claim 13, further comprising a phoneme mapping unit for initializing at least some acoustic sub-word units in said second subgroup of acoustic sub-word units with respective speech models in said first subgroup to generate said untrained speech models at least in part on the basis of a nearest sub-word unit method.

18. An apparatus as defined in claim 13, said apparatus comprising:
- a processor;
- a computer readable storage medium coupled to said processor, said computer readable storage medium comprising a program element for execution by said processor for implementing said processing unit.

19. An apparatus as defined in claim 11, wherein said processing unit being further operative for computing transformation weights for use in determining said at least one acoustic sub-word unit of said first subgroup that is acoustically similar to said at least one acoustic sub-word unit of said second subgroup.

20. An apparatus as defined in claim 11, wherein said processing unit being further operative for comparing said at least one acoustic sub-word unit of said second subgroup with each acoustic sub-word unit of said first subgroup and computing transformation weights to for determining said at least one acoustic sub-word unit of said first subgroup that is acoustically similar to said at least one acoustic sub-word unit of said second subgroup.

21. A computer readable storage medium containing a program element suitable for use on a computer having a memory, said memory being suitable for storing:
- a) a group of acoustic sub-word units comprising:
  - a first subgroup of acoustic sub-word units associated to a first language with each acoustic sub-word unit having an associated speech model;
  - a second subgroup of acoustic sub-word units associated to a second language;
  - said first subgroup and said second subgroup sharing at least one common acoustic sub-word unit;
- b) a plurality of letter to acoustic sub-word unit rules sets, each letter to acoustic sub-word unit rules set being associated to a different language;
- c) a training set comprising a plurality of entries, each entry having a speech token representative of a word and a label being an orthographic representation of the word;
- d) a set of untrained speech models, said set of untrained speech models comprising at least one untrained speech model, said one untrained speech model generated by initializing at least one acoustic sub-word unit of said second subgroup with said associated speech model of at least one acoustic sub-word unit of said first subgroup that is acoustically similar to said at least one acoustic sub-word unit of said second subgroup;
- said program element being operative for training the set of untrained speech models by utilizing said training set, said plurality of letter to acoustic sub-word unit rules sets and said group of acoustic sub-word units to derive a multilingual speech model set.

22. A computer readable storage medium as defined in claim 21, wherein said memory being further suitable for storing:
- transformation weights for use in determining said at least one acoustic sub-word unit of said first subgroup that is acoustically similar to said at least one acoustic sub-word unit of said second subgroup.

23. An apparatus for generating a multilingual speech model set, said multilingual speech model set being suitable for use in a multilingual speech recognition system, said apparatus comprising:
- a) means for storing:
  - i) acoustic data elements representative of a group of acoustic sub-word units comprising:
    - a first subgroup of acoustic sub-word units associated to a first language with each acoustic sub-word unit having an associated acoustic data element;
    - a second subgroup of acoustic sub-word units associated to a second language;
    - said first subgroup and said second subgroup sharing at least one common acoustic sub-word unit;
  - ii) a plurality of letter to acoustic sub-word unit rules sets, each letter to acoustic sub-word unit rules set being associated to a different language;
  - iii) a training set comprising a plurality of entries, each entry having a speech token representative of a word and a label being an orthographic representation of the word;
  - iv) a set of untrained speech models, said set of untrained speech models comprising at least one untrained speech model, said one untrained speech model generated by initializing at least one acoustic sub-word unit of said second subgroup with said associated acoustic data element of at least one acoustic sub-word unit of said first subgroup that is acoustically similar to said at least one acoustic sub-word unit of said second subgroup;
- means for training the set of untrained speech models by utilizing said training set, said plurality of letter to acoustic sub-word unit rules sets and said group of acoustic sub-word units to derive the multilingual speech model set.

24. An apparatus as defined in claim 23, further comprising:
- means for computing transformation weights for use in determining said at least one acoustic sub-word unit of said first subgroup that is acoustically similar to said at least one acoustic sub-word unit of said second subgroup.

* * * * *

UNITED STATES PATENT AND TRADEMARK OFFICE
CERTIFICATE OF CORRECTION

PATENT NO.   : 6,912,499 B1  
DATED        : June 28, 2005  
INVENTOR(S)  : Michael G. Sabourin and Serge Robillard It is certified that error appears in the above-identified patent and that said Letters Patent is hereby corrected as shown below:

Column 15,  
Line 61, after "weights" delete "to".

Column 17,  
Line 46, after "weights" delete "to".

Column 18,  
Line 54, prior to "means" insert -- b) --.

Signed and Sealed this

First Day of November, 2005

JON W. DUDAS  
*Director of the United States Patent and Trademark Office*